United States Patent
Gilbert et al.

(10) Patent No.: US 8,123,246 B2
(45) Date of Patent: Feb. 28, 2012

(54) VEHICLE SEAT

(75) Inventors: Tassilo Gilbert, Pforzheim (DE); Dieter Jungert, Weissach (DE); Thomas Miodek, Magstadt (DE); Markus Heinisch, Deufringen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/717,169

(22) Filed: Mar. 4, 2010

(65) Prior Publication Data
US 2010/0244414 A1 Sep. 30, 2010

(30) Foreign Application Priority Data

Mar. 31, 2009 (DE) .................. 10 2009 016 666

(51) Int. Cl.
*B60R 21/16* (2006.01)
(52) U.S. Cl. ............. 280/728.2; 280/728.3; 280/730.2
(58) Field of Classification Search ............ 280/728.2, 280/728.3, 730.2
See application file for complete search history.

(56) References Cited

U.S. PATENT DOCUMENTS

| | | | |
|---|---|---|---|
| 5,505,487 A | 4/1996 | Brown et al. | |
| 5,667,242 A | 9/1997 | Slack et al. | |
| 6,126,192 A | 10/2000 | Enders | |
| 6,450,528 B1 * | 9/2002 | Suezawa et al. | 280/730.2 |
| 6,592,144 B2 * | 7/2003 | Acker et al. | 280/730.2 |
| 7,021,654 B2 * | 4/2006 | Honda et al. | 280/730.2 |
| 7,284,768 B2 * | 10/2007 | Tracht | 280/730.2 |
| 7,290,794 B2 * | 11/2007 | Tracht | 280/730.2 |
| 7,331,601 B2 * | 2/2008 | Tracht | 280/730.2 |
| 7,393,005 B2 * | 7/2008 | Inazu et al. | 280/730.2 |
| 7,637,529 B2 * | 12/2009 | Tracht | 280/728.3 |
| 7,669,888 B2 * | 3/2010 | Sato et al. | 280/730.2 |
| 7,677,594 B2 * | 3/2010 | Hazlewood et al. | 280/728.2 |
| 7,681,907 B2 * | 3/2010 | Svenbrant et al. | 280/728.2 |
| 7,695,004 B2 * | 4/2010 | Inoue | 280/730.2 |
| 2004/0169356 A1 | 9/2004 | Linder et al. | |
| 2010/0007119 A1 | 1/2010 | Ryden et al. | |

FOREIGN PATENT DOCUMENTS

| | | |
|---|---|---|
| DE | 10 2005 033 677 | 2/2007 |
| EP | 1 426 244 | 6/2004 |

* cited by examiner

*Primary Examiner* — Toan To
(74) *Attorney, Agent, or Firm* — Gerald E. Hespos; Michael J. Porco

(57) ABSTRACT

A vehicle seat has a seat element that forms a seat surface and has a seat back (10) or backrest. The seat back (10) has a frame (14) and an airbag (19). The airbag (19) has a gas-receiving element (20) and an inflating device (21) for the gas-receiving element (20). The gas-receiving element (20) is defined at one side by a portion (15) of the frame (14) and at the other side by a delimiting element (22) that is fastened to the frame (14) and that can be displaced as the airbag (19) inflates.

18 Claims, 2 Drawing Sheets

US 8,123,246 B2

VEHICLE SEAT

CROSS-REFERENCE TO RELATED APPLICATIONS

This application claims priority under 35 USC 119 to German Patent Application No. 10 2009 016 666.1 filed on Mar. 31, 2009, the entire disclosures of which are incorporated herein by reference.

BACKGROUND OF THE INVENTION

1. Field of the Invention

The invention relates to a vehicle seat.

2. Description of the Related Art

EP 1 426 244 A1 discloses a motor vehicle with a body structure and a vehicle seat fastened to the body structure. The vehicle seat disclosed in EP 1 426 244 A1 has a seat element that forms a seat surface and a seat back. The seat back runs approximately vertically and is adjustable with respect to its inclination. An airbag module that provides thorax protection is integrated into a back cheek of the seat back of the vehicle seat shown in EP 1 426 244 A1.

DE 10 2005 033 677 A1 discloses another vehicle seat with an airbag module integrated into the seat back or back rest to provide thorax protection. The airbag module is fastened to a frame of the seat back or backrest by means of an inflating device of the airbag module.

The vehicle seats known from the above-described prior art each have separate airbag modules integrated therein. The airbag modules have a gas-receiving element formed as a gas sack and an inflating device designed as a gas generator. Airbag modules are provided by suppliers as fully independent modules and are integrated as functionally and structurally separate modules into a vehicle seat. This results in a relatively high weight for a vehicle seat.

In view of the above, it is the object of the present invention to create a relatively low weight vehicle seat that can be produced at relatively low cost.

SUMMARY OF THE INVENTION

The invention relates to a gas-receiving element that is defined or delimited at one side by a portion of the frame of a vehicle seat and at the other side by a delimiting element that is fastened to the frame and that can be displaced or deformed as the airbag inflates.

The vehicle seat of the invention does not have a separate airbag module. Rather, the gas-receiving element of the airbag is defined at one side by a portion of the frame of the seat back and at the other side by a delimiting element that is fastened to the frame and that can be displaced as the airbag inflates. Functions of an airbag that previously were performed by a separate module have been relocated into the vehicle seat, specifically into the seat back, in accordance with the invention and accordingly these functions are performed by assemblies of the vehicle seat. As a result, the weight and costs of the vehicle seat can be reduced. The seat back and the airbag form an integrated combination in accordance with the vehicle seat of the subject invention.

Exemplary embodiments of the invention are explained in more detail on the basis of the drawing, without the invention being restricted to these embodiments.

DETAILED DESCRIPTION OF THE PREFERRED EMBODIMENT

Figure 1:
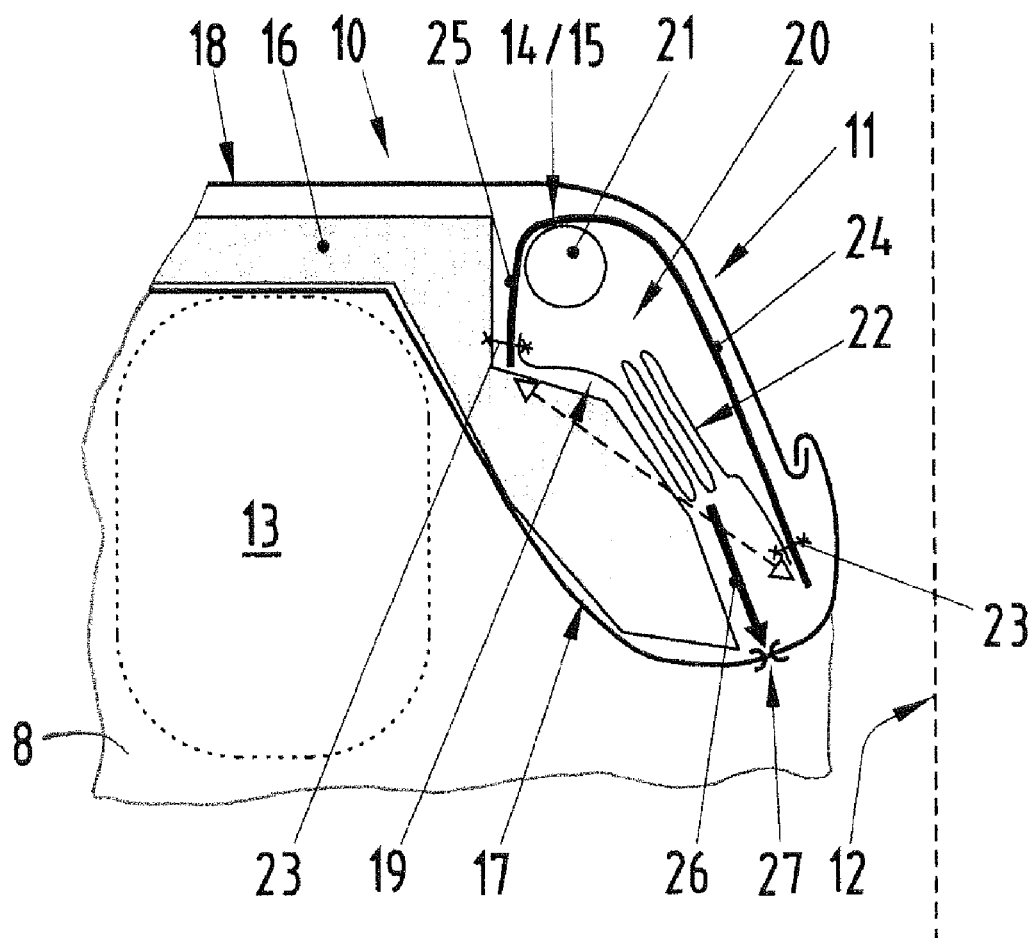
FIG. 1 is a highly schematic cross section through a seat back or backrest of a vehicle seat according to the invention.
Figure 2:
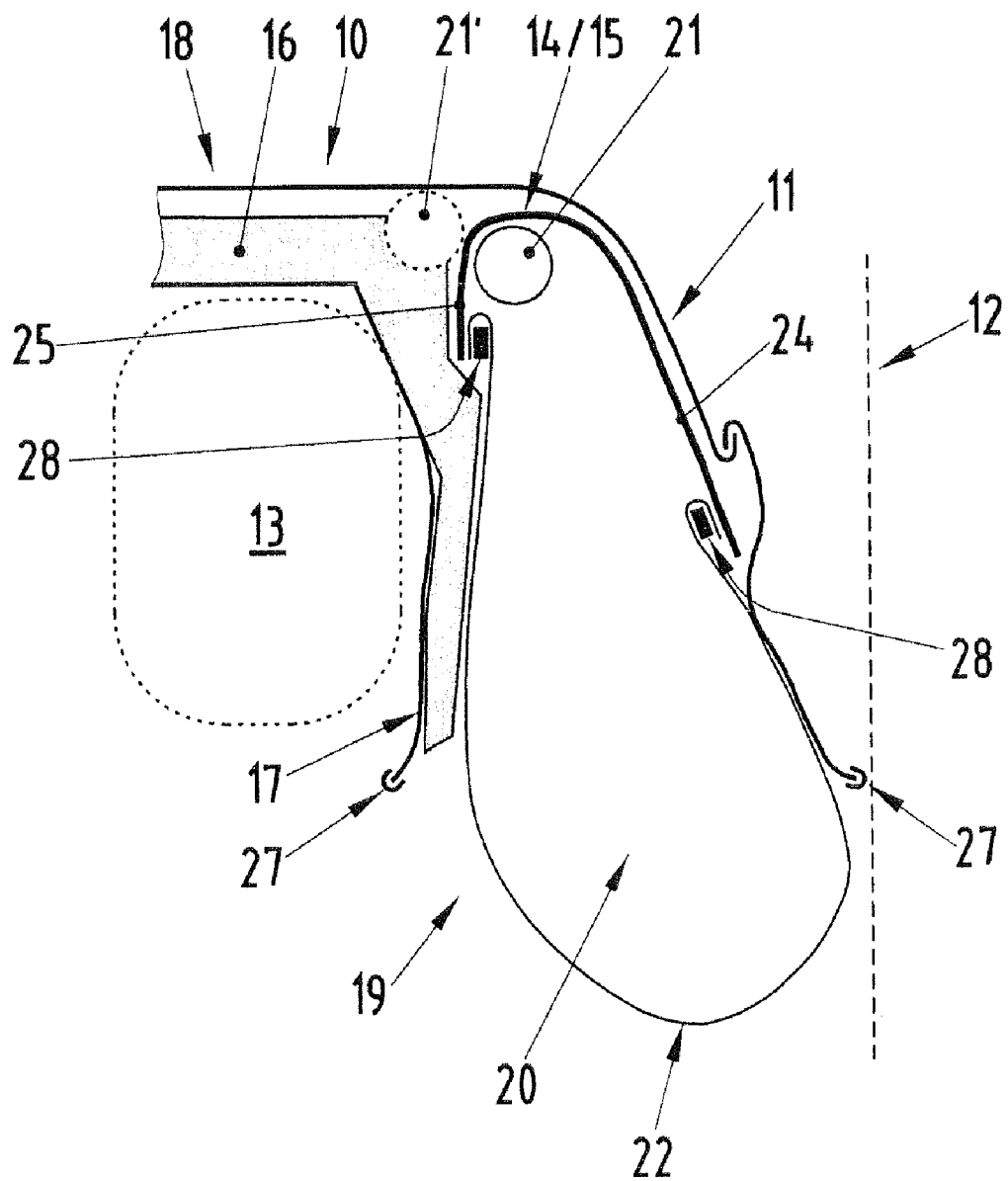
FIG. 2 shows an illustration similar to FIG. 1, with the airbag inflated.

A seat back of a vehicle seat according to the invention is identified by the numeral 10 in FIGS. 1 and 2. The seat back 10 also is referred to as a backrest. The seat back 10 extends substantially vertically, but the inclination of the seat back 10 can be adjusted relative to a seat element 8 that provides a generally horizontal seat surface.

The section direction of the cross section through the seat back 10 shown in FIGS. 1 and 2 extends horizontally. A door lining 12 of a body structure of a motor vehicle in which the vehicle seat of the invention is used is shown adjacent to the seat back 10, and specifically adjacent to a forward-extending back cheek 11 of the seat back 10. FIGS. 1 and 2 also show, in highly schematic form, a vehicle occupant 13 seated on the vehicle seat. Here, the back cheek 11 extends laterally adjacent to the vehicle occupant 13.

The seat back 10 comprises a frame 14. FIGS. 1 and 2 show only those sections 15 of the frame 14 that extend into the region of the back cheek 11 that can be seen in FIGS. 1 and 2. The frame 14 of the seat back 10 preferably is a cast part that is made from an aluminium alloy or magnesium alloy. More particularly, the frame 14 may be produced by a cold-chamber die-casting process, a hot-chamber die-casting process or a Thixomolding process.

A front or inner side of the frame 14 of the seat back 10 of the vehicle seat is adjoined by a cushion 16 that is covered by a lining 17. A panel 18 adjoins a rear or outer side of the frame 14.

The vehicle seat of the invention has an airbag 19 formed by a gas-receiving element 20 and an inflating device 21 for the gas-receiving element 20. The gas-receiving element 20 also may be referred to as a gas sack or air sack, and the inflating device 21 may be referred to as a gas generator.

The gas-receiving element 20 is defined or delimited at one side by that portion 15 of the frame 14 that extends into the back cheek 11 of the seat back 10 of the vehicle seat and at the other side by a delimiting element 22 that is fastened to the portion 15 of the frame 14 and that can be displaced or deformed as the airbag 19 inflates.

The gas-receiving element 20 of the airbag 19 of the vehicle seat is not a constituent part of a separate airbag module. Rather, the gas-receiving element 20 is delimited in sections or partially by the portion 15 of the frame 14 of the seat back 10. The delimiting element 22, which can be displaced as the inflation takes place, is connected fixedly to the portion 15 of the frame 14 by fastening elements 23. More particularly, the delimiting element 22 is fastened directly to that portion 15 of the frame 14 that extends in the back cheek 11. The fastening of the delimiting element 22 to the portion 15 of the frame 14 may be achieved by clips, rivets, clinching, screws, adhesive or the like.

The portion 15 of the frame 14 that delimits the gas-receiving element 20 of the airbag 19 in sections projects integrally into the back cheek 11 of the seat back 10. More particularly, that portion 15 of the frame 14 that delimits the gas-receiving element 20 of the airbag 19 in sections is of U-shaped contour in cross section. Thus, the portion 15 of the frame 14 that delimits the gas-receiving element 20 has a substantially forward-extending outer limb 24 and a substantially forward-extending inner limb 25. The outer limb 24 extends farther forward than the inner limb 25. The delimiting element 22 engages on and is fastened to the limbs 24 and 25 of the portion 15 of the frame 14. As noted above, the delimiting element 22 can be displaced as the inflation takes place and cooperates with the portion 15 of the frame 14 to delimit the gas-receiving element 20 of the airbag 19.

The delimiting element 22, which can be displaced or deformed as the inflation takes place, preferably is a textile element and may be formed in one or more pieces.

In the event of a crash, the gas-receiving element 20 of the airbag 19 unfolds in the direction of the arrow 26 shown in FIG. 1, and hence unfolds between the cushion 16 and the limb 24 of the portion 15 through a predetermined breaking point 27 of the lining 17. FIG. 2 shows the gas-receiving element 20 in the unfolded state.

FIG. 2 also shows variants of the invention. For example, in FIG. 2, the delimiting element 22, which can be displaced as the airbag 19 inflates, is not fastened directly to the portion 15 of the frame 14, but rather is fastened indirectly by a mounting element 28. The mounting element 28 is designed as a mounting frame by means of which the delimiting element 22 is fastened to the frame 14.

In FIGS. 1 and 2, the inflating device 21 also is fastened to the portion 15 of the frame 14, so that the inflating device 21 is within the gas-receiving element 20 defined by the portion 15 of the frame 14 and by the delimiting element 22.

FIG. 2 shows a variant in this regard with an inflating device 21' depicted in dashed lines. The inflating device 21' is fastened to the portion 15 of the frame 14 but is positioned outside the gas-receiving element 20 defined by the portion 15 of the frame 14 and by the delimiting element 22. Thus, the inflating device 21' introduces gas or air for unfolding the airbag 19 into the gas-receiving element 20 via openings or bores formed in the portion 15.

The inflating device 21, 21' may engage on the portion 15 of the frame 14 either directly or indirectly with the interposition of a damping element (not shown). The damping element may be produced, for example, from a vibration-absorbing material.

The invention accordingly relates to a vehicle seat in which a portion 15 of the frame 14 of the seat back 10 projects into the back cheek 11 of the seat back 10 and forms a partial delimitation of the gas-receiving element 20 of the airbag 19. A delimiting element 22, which preferably is formed as a textile element, is engaged on the portion 15 of the frame 14 and can be displaced or deformed as the airbag 19 inflates. The delimiting element 22 closes off a front recess or opening of the portion 15 of the frame 14. The portion 15 of the frame 14 that cooperates with the delimiting element 22 to delimit the gas-receiving element 20 of the airbag 19 cannot be displaced or deformed as the inflation takes place.

The gas-receiving element 20 of the airbag 19 is delimited at least partially by the frame 14 of the seat back 10 of the vehicle seat. Thus, the airbag 19 is no longer a separate, functionally and structurally independent airbag module 19. Rather, the airbag functions of the airbag 19 are functionally and structurally integrated into the vehicle seat in such a way that the frame 14 of the seat back 10 is a structural and functional constituent part of the airbag 19, specifically the gas-receiving element 20 of the airbag 19. Weight and costs for a vehicle seat can be reduced in this way. The airbag 19 is a side airbag and may provide thorax protection, pelvis protection and/or head protection.

In the event of a crash, the delimiting element 22 unfolds as the inflation takes place moves forward and out between the cushion 16 and the limb 24 of the portion 15 in the direction of the arrow 26. Here, the predetermined breaking point 27 of the lining 17 is severed. Although the unfolding direction of the airbag 19 shown in FIGS. 1 and 2 is preferred, some other unfolding direction of the airbag 19 is also possible while utilizing the invention.

As explained above, FIGS. 1 and 2 show a horizontally extending cross section through the seat back 10. Along the vertical extent of the seat back 10, that portion 15 of the frame 14 in FIGS. 1 and 2 that extends into the back cheek 11 may have formed in it one or more front recesses or openings that are closed off by the delimiting element 22 and through which, in the event of a crash, the airbag 19 unfolds substantially forward out of the back cheek 11 in the direction of the arrow 26.

What is claimed is:

1. A vehicle seat comprising: a seat element that forms a seat surface and a seat back, the seat back having a frame and a deformable delimiting element fastened to the frame, a gas-receiving space being defined between the frame and the deformable delimiting element and an inflating device for directing gas into the gas-receiving space, whereby the gas-receiving space is defined at one side by a portion of the frame and at an opposite side by the deformable delimiting element that is fastened to the frame so that the deformable delimiting element is displaceable away from the frame as gas is directed into the gas-receiving space.

2. The vehicle seat of claim 1, wherein the seat back includes a forwardly projecting back cheek on an outer lateral side of the seat back, the portion of the frame that delimits the gas-receiving space projects into the back cheek of the seat back.

3. The vehicle seat of claim 2, wherein the portion of the frame that delimits the gas-receiving space is of U-shaped or L-shaped contour in cross section.

4. The vehicle seat of claim 3, wherein the portion of the frame that delimits the gas-receiving space has a substantially forward-extending outer limb and a substantially forward-extending inner limb, the outer limb extending farther forward than the inner limb.

5. The vehicle seat of claim 1, wherein the deformable delimiting element is a deformable textile element.

6. The vehicle seat of claim 1, wherein the deformable delimiting element is fastened directly to the frame.

7. The vehicle seat of claim 1, wherein the deformable delimiting element is fastened indirectly to the frame by a mounting element.

8. The vehicle seat of claim 1, wherein the inflating device is fastened to the portion of the frame that delimits the gas-receiving space.

9. The vehicle seat of claim 8, wherein the inflating device is positioned within the gas-receiving space.

10. The vehicle seat of claim 8, wherein the inflating device is positioned outside the gas-receiving space.

11. A vehicle seat comprising a seat element that forms a seat surface and a seat back extending up from the seat element, the seat back having a forwardly projecting seat cheek disposed at least at one lateral side of the seat back, the seat back further having a frame configured for supporting the seat back, the frame including at least one rigid channel with an outer limb projecting forward into the seat cheek and an inner limb, a deformable delimiting element fastened to the outer and inner limbs so that a gas-receiving space is defined between the deformable delimiting element and the rigid channel of the frame of the seat back and an inflating device fastened to the frame of the seat back for directing gas into the gas-receiving space between the channel and the deformable delimiting element.

12. The vehicle seat of claim 11, wherein the rigid channel of the frame that defines part of the gas-receiving space is of U-shaped or L-shaped contour in cross section.

13. The vehicle seat of claim 12, wherein the deformable delimiting element is a deformable textile.

14. The vehicle seat of claim 12, wherein the inflating device is fastened to the rigid channel of the frame that delimits the gas-receiving space.

15. The vehicle seat of claim 14, wherein the inflating device is positioned within the gas-receiving space.

16. The vehicle seat of claim 14, wherein the inflating device is positioned outside the gas-receiving space.

17. The vehicle seat of claim 11, wherein a portion of the frame and the deformable delimiting element each face directly into the gas-receiving space.

18. The vehicle seat of claim 1, wherein a portion of the frame and the deformable delimiting element each face directly into the gas-receiving space.

* * * * *